Figures 1, 2, 3:
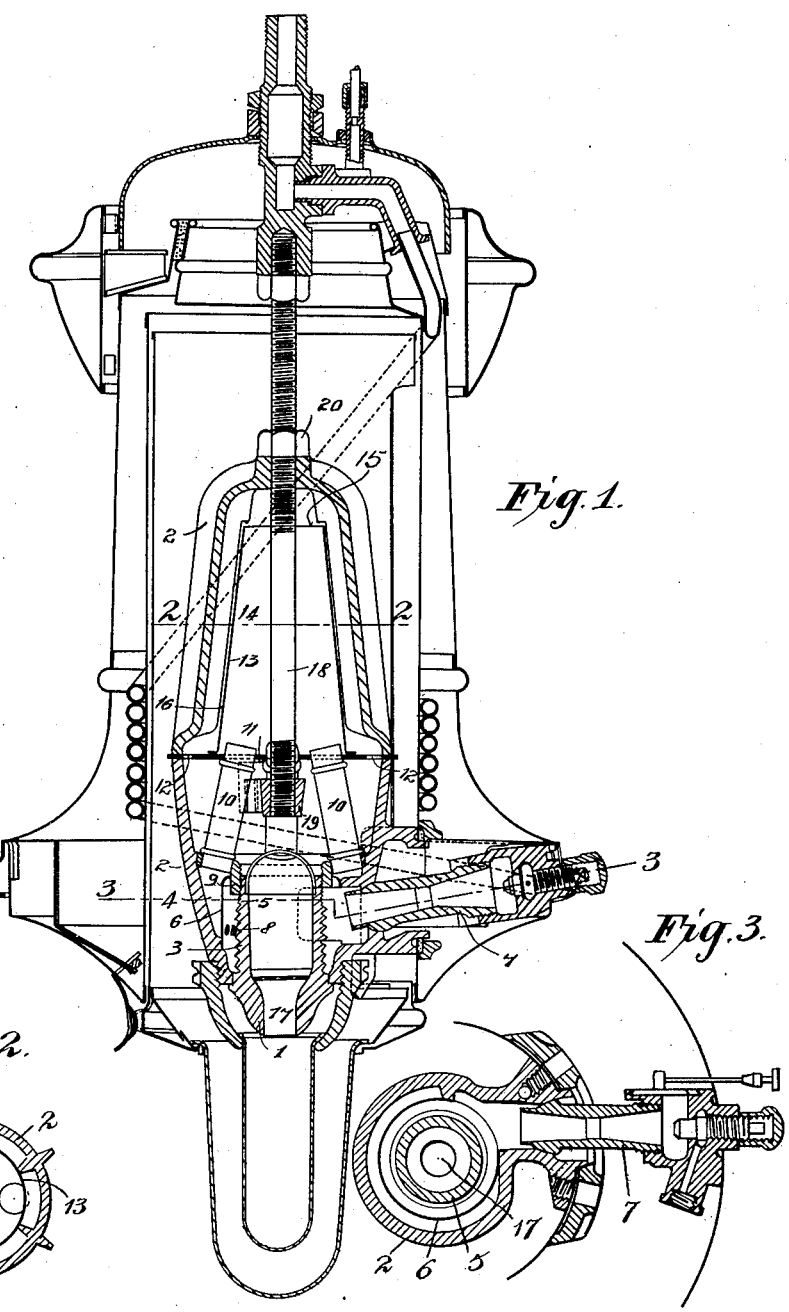

G. KEITH.
GAS LAMP.
APPLICATION FILED NOV. 3, 1913.

1,094,214.

Patented Apr. 21, 1914.

WITNESSES

INVENTOR
GEORGE KEITH
By Hvan Oldennel
ATTORNEY

UNITED STATES PATENT OFFICE.

GEORGE KEITH, OF LONDON, ENGLAND, ASSIGNOR OF ONE-HALF TO JAMES KEITH, OF LONDON, ENGLAND.

GAS-LAMP.

1,094,214.　　　　　Specification of Letters Patent.　　Patented Apr. 21, 1914.

Application filed November 3, 1913. Serial No. 798,940.

*To all whom it may concern:*

Be it known that I, GEORGE KEITH, a subject of the King of the United Kingdom of Great Britain and Ireland, and residing at London, England, have invented a certain new and useful Improvement in Gas-Lamps, of which the following is a specification.

This invention relates to improvements in high pressure inverted incandescent gas lamps of the type provided with a heater for the mixture associated with a metallic nozzle of good heat-conducting capacity in thermal contact therewith as described for instance in the specification of Letters Patent No. 917876.

The primary object of the invention is to provide for direction of the mixture in contact with hot portions of the structure comprising the heater, nozzle, etc., along a course comprising stages representing as far as conditions will permit what are practically zones of progressively increasing temperature so that the mixture will be progressively heated, and at the same time, while itself still comparatively cold, abstract heat from those parts of the structure the temperature of which should be maintained within safe limits having regard to the explosive nature of the mixture and the liability to destruction or deterioration of the metal.

In the accompanying drawing, in which is illustrated, by way of example, a lamp embodying the invention, Figure 1 is a longitudinal vertical sectional view of the lamp; and Figs. 2 and 3 show fragmental sections taken partly on the lines 2—2 and 3—3 of Fig. 1.

Referring to the drawing, 1 is a nozzle extending upwardly within the interior of the heater 2—the extension 5 of said nozzle being preferably provided with corrugations 3 affording a radiating surface—so that an annular space 4 is left between said extension 5 and the lower extremity of said heater 2. Fitted in said annular space is a perforated casing 6 serving as a partition and inclosing a gyratory chamber. The injector tube 7 is fitted to the heater structure at a point in close proximity to the upper extension 5 of the nozzle 1, being preferably disposed tangentially of said extension; so that the mixture is first caused to circulate around said extension 5 and then to pass through the perforations 8 in the partition 6 into contact with the inner surface of the lower end of said heater 2.

The upper end of the extension 5 is connected to an annulus 9 sustained by the heater 2, e. g., is in screw-threaded engagement with said annulus 9, which latter is cooled by contact with the mixture and serves to take up heat from the nozzle 1 besides affording an additional path for heat traveling from said nozzle to the heater 2. Said annulus 9 is formed as a tube plate into which are fitted the lower ends of a number of tubes 10, which may be of heat-insulating material or covered with heat-insulating material, and the upper ends of which enter orifices in a disk 11 or partition extending transversely of the heater 2 preferably at the junction of the halves thereof and provided with perforations 12 at or near its periphery. Rising from said disk 11 is a funnel 13 forming a compartment into which said tubes 10 lead. It will be understood that the mixture rising through said tubes 10 enters the interior 14 of the funnel 13, passes over the upper edge 15 thereof, flows downwardly through the space 16 between said funnel 13 and the inner surface of the internally and externally ribbed upper half of the heater 2, through the perforations 12 in the periphery of the disk 11, around the tubes 10 in the lower half of said heater and through the bore 17 of the nozzle 1 to the mantle.

A central rod 18 supported at its upper end by the lamp structure and in screw-threaded engagement with a boss 19 formed on a cross-bar fixed in the lower end of the heater 2 serves in conjunction with a nut 20 to hold together the halves of the heater.

What I claim is:—

1. In an inverted incandescent gas lamp, in combination, a heater for the mixture of gas and air, a metallic nozzle in thermal contact with said heater, said nozzle having an extension located within said heater and spaced from the wall of said heater, a partition fitted in the space between said extension and the wall of said heater and affording a gyratory chamber having a perforated wall, an injector tube serving to lead a mixture of gas and air into the interior of said chamber, and ducts within the heater serving to lead upwardly within the heater the mixture escaping through the perforations in the wall of said chamber and so arranged as to leave for passage of the mixture a path surrounding said ducts and leading to the interior of the nozzle.

2. In an incandescent gas lamp, in combination, a heater for the mixture of gas and air, a metallic nozzle having an extension located within said heater, said extension being spaced from the interior wall of said heater, a partition fitted in the space between said extension and the wall of said heater and affording a chamber having an outlet, a tube serving to lead a mixture of gas and air into the interior of said chamber and guiding means for leading the mixture issuing from the outlet in said chamber in contact with the hot wall of the heater and thence to the interior of the nozzle.

In testimony whereof I have signed my name to this specification in the presence of two subscribing witnesses.

GEORGE KEITH.

Witnesses:
M. BURMINGHAM,
J. W. HAMPSHIRE.

---

Copies of this patent may be obtained for five cents each, by addressing the "Commissioner of Patents, Washington, D. C."